US010873283B2

United States Patent
Gyoten

(10) Patent No.: US 10,873,283 B2
(45) Date of Patent: Dec. 22, 2020

(54) ACTUATOR DRIVING DEVICE

(71) Applicant: Panasonic Intellectual Property Management Co., Ltd., Osaka (JP)

(72) Inventor: Takaaki Gyoten, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/747,885

(22) Filed: Jan. 21, 2020

(65) Prior Publication Data

US 2020/0235685 A1 Jul. 23, 2020

(30) Foreign Application Priority Data

Jan. 23, 2019 (JP) ................. 2019-009662

(51) Int. Cl.
| | | |
|---|---|---|
| *H02K 41/00* | (2006.01) | |
| *H02P 1/00* | (2006.01) | |
| *H02P 3/00* | (2006.01) | |
| *H02P 5/00* | (2016.01) | |
| *H02P 7/025* | (2016.01) | |
| *H02P 7/29* | (2016.01) | |
| *H02P 7/292* | (2016.01) | |

(52) U.S. Cl.
CPC ............ *H02P 7/025* (2016.02); *H02P 7/29* (2013.01); *H02P 7/292* (2013.01); *H02P 2205/01* (2013.01)

(58) Field of Classification Search
CPC .................................. H02P 7/025; H02P 7/29
USPC ........................................................ 318/135
See application file for complete search history.

(56) References Cited

U.S. PATENT DOCUMENTS

2005/0189891 A1* 9/2005 Kurosawa ............... H02P 6/28
318/400.35
2008/0036407 A1 2/2008 Okui
(Continued)

FOREIGN PATENT DOCUMENTS

| JP | 2002-238290 | 8/2002 |
|---|---|---|
| JP | 2007-159365 | 6/2007 |
| JP | 2008-43171 | 2/2008 |

(Continued)

*Primary Examiner* — Erick D Glass
(74) *Attorney, Agent, or Firm* — Wenderoth, Lind & Ponack, L.L.P.

(57) ABSTRACT

An actuator driving device includes: first and second half bridge circuits driven according to modulated drive signals having an inverted relationship, generates a drive voltage for an actuator by switching a DC voltage, and outputs the drive voltage to the actuator; a current detection resistor which generates a current detection signal corresponding to current flowing through a series circuit including first and second switching elements and a series circuit including third and fourth switching elements; a hold circuit which holds the current detection signal from the current detection resistor and generates an output signal; a comparator which compares the output signal with a target amplitude signal to generate a comparison result signal; a multiplier which multiplies the comparison result signal and the drive signal to generate a multiplication result signal; and a PWM modulator which performs PWM modulation according to the multiplication result signal to generate a modulated drive signal.

4 Claims, 2 Drawing Sheets

(56) References Cited

U.S. PATENT DOCUMENTS

2013/0175954 A1* 7/2013 Astigarraga .............. H02P 3/12
318/376
2018/0287547 A1* 10/2018 Kim ..................... H02P 29/027

FOREIGN PATENT DOCUMENTS

| JP | 2009-219288 | 9/2009 |
| JP | 2014-147221 | 8/2014 |

* cited by examiner

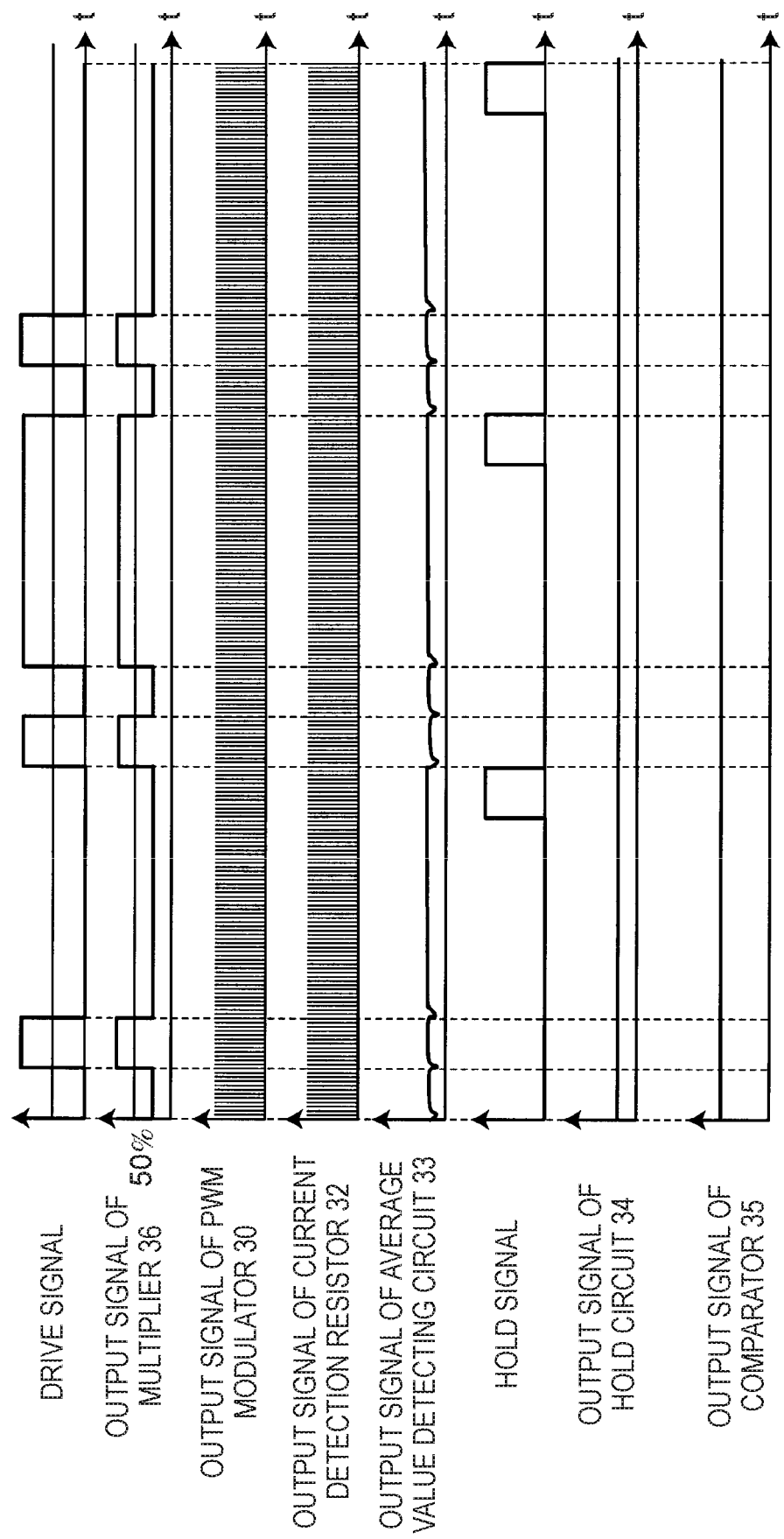

ACTUATOR DRIVING DEVICE

BACKGROUND

1. Technical Field

The present disclosure relates to an actuator driving device which drives an actuator capable of obtaining the amount of displacement proportional to an applied drive current.

2. Description of Related Art

Japanese Unexamined Patent Application Publication No. 2014-147221 discloses an actuator driving device which drives an actuator capable of obtaining the amount of displacement proportional to an applied drive current. The actuator driving device drives the actuator by amplifying a voltage obtained by performing digital to analog (D/A) conversion on a digital voltage output of a controller. The actuator driving device detects a current flowing through the actuator by a resistor, performs analog-to-digital (A/D) conversion on the detected current so that the controller detects a current value, and adjusts the digital voltage output so that the current becomes the target value. The actuator driving device performs damping on the actuator by driving the actuator with a voltage, and controls the current flowing through the actuator by detecting and controlling the current. Accordingly, the actuator driving device is capable of controlling the amount of displacement of the actuator capable of obtaining the amount of displacement proportional to an applied drive current.

An actuator driving device according to the present disclosure, which drives an actuator capable of obtaining the amount of displacement proportional to an applied drive current, is capable of accurately controlling the amount of displacement as compared with a conventional technique, and increasing the range of motion of the actuator.

SUMMARY

An actuator driving device according to one aspect of the present disclosure includes a first half bridge circuit and a second half bridge circuit which are driven according to a pair of modulated drive signals having a mutually inverted relationship. The first half bridge circuit and the second half bridge circuit switch a direct-current (DC) voltage from a power supply to generate a drive voltage for the actuator and output the drive voltage to the actuator. The first half bridge circuit includes a first switching element and a second switching element. The second half bridge circuit includes a third switching element and a fourth switching element. The first switching element and the second switching element are connected to each other in series, and turned on and off according to the pair of modulated drive signals having a mutually inverted relationship. The third switching element and the fourth switching element are connected to each other in series, and turned on and off according to inverted signals of the pair of modulated drive signals having a mutually inverted relationship. A first end of a series circuit including the first switching element and the second switching element and a first end of a series circuit including the third switching element and the fourth switching element are both connected to a positive end of the power supply. A second end of the series circuit including the first switching element and the second switching element and a second end of the series circuit including the third switching element and the fourth switching element are connected to each other. The actuator driving device further includes a current detection resistor, a hold circuit, a comparator, a multiplier, and a pulse-width modulation (PWM) modulator. The current detection resistor is connected between a connection point and a negative polarity of the power supply. The connection point is a point where the second end of the series circuit including the first switching element and the second switching element is connected to the second end of the series circuit including the third switching element and the fourth switching element. The current detection resistor generates and outputs a current detection signal corresponding to a detected current. The hold circuit holds the current detection signal from the current detection resistor during a predetermined hold period according to a predetermined hold signal, and generates and outputs an output signal after the holding. The comparator compares the output signal after the holding with a predetermined target amplitude signal, and generates and outputs a comparison result signal indicating a result of the comparison. The multiplier multiplies the comparison result signal and a predetermined drive signal, and generates and outputs a multiplication result signal indicating a result of the multiplication. The PWM modulator generates a modulated drive signal by performing PWM modulation on a high-frequency signal having a predetermined period according to the multiplication result signal, and outputs the modulated drive signal to the first half bridge circuit and the second half bridge circuit.

An actuator driving device according to the present disclosure performs damping on an actuator capable of obtaining the amount of displacement proportional to an applied drive current by driving the actuator with a constant voltage, detects a current flowing through the actuator, and accurately controls the amount of current. Accordingly, it is possible to provide an actuator driving device which controls the amount of displacement accurately, increasing the range of motion of the actuator by allowing a drive voltage to be inversible between positive and negative polarities, and increasing the power efficiency.

BRIEF DESCRIPTION OF DRAWINGS

FIG. 2 is a timing chart of a signal waveform of each unit indicating an operation of the actuator driving device illustrated in FIG. 1.

DETAILED DESCRIPTION

Figure 1:
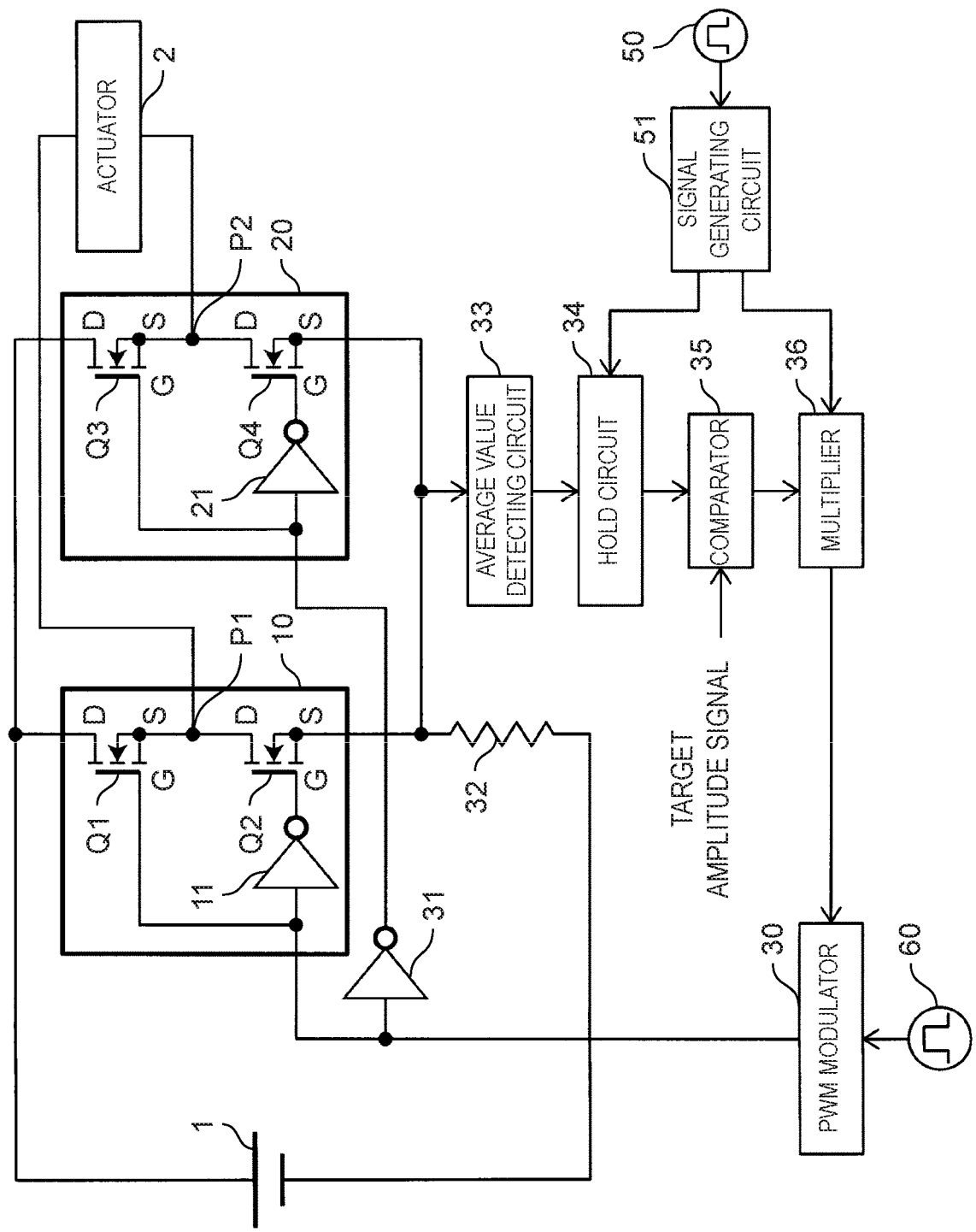
FIG. 1 illustrates a configuration example of an actuator driving device according to a first embodiment.

Hereinafter, embodiments will be described in detail with reference to the drawings appropriately. However, unnecessarily detailed descriptions may be omitted. For example, detailed description of well-known matter or repeated description of essentially similar elements may be omitted. This is to avoid redundancy and make the following description easier for those skilled in the art to understand.

Note that the inventor has provided the accompanying drawings and following description in order to facilitate sufficient understanding of the present disclosure for those skilled in the art, and as such, are not intended to limit the subject matter described in the claims.

First Embodiment

Hereinafter, a first embodiment will be described with reference to FIG. 1 to FIG. 2.

[1-1. Configuration] FIG. 1 illustrates a configuration of an actuator driving device according to the first embodiment.

In FIG. 1, the actuator driving device drives actuator 2, which is, for example, a voice coil motor, based on a direct-current (DC) voltage from DC power supply 1. Here, the actuator driving device includes: two half bridge circuits 10 and 20; pulse width modulation (PWM) modulator 30; inverter 31; current detection resistor 32; average value detecting circuit 33; hold circuit 34; comparator 35; multiplier 36; signal generator 50 which generates a low-frequency signal having a predetermined period and signal generator 60 which generates a high-frequency signal having a predetermined period; and signal generating circuit 51.

Half bridge circuit 10 includes: metal-oxide-silicon (MOS) transistors Q1 and Q2, which are, for example, two N-channel MOS field effect transistors, connected to each other in series; and inverter 11. The positive polarity of DC power supply 1 is connected to one end of current detection resistor 32 via the drain and the source of MOS transistor Q1 and the drain and the source of MOS transistor Q2. A modulated drive signal from PWM modulator 30 is applied to the gate of MOS transistor Q1, and also to the gate of MOS transistor Q2 via inverter 11.

Half bridge circuit 20 includes: MOS transistors Q3 and Q4, which are, for example, two N-channel MOS field effect transistors, connected to each other in series; and inverter 21. The positive polarity of DC power supply 1 is connected to one end of current detection resistor 32 via the drain and the source of MOS transistor Q3 and the drain and the source of MOS transistor Q4. The modulated drive signal from PWM modulator 30 is applied to the gate of MOS transistor Q3 via inverter 31, and also to the gate of MOS transistor Q4 via inverters 31 and 21. The other end of current detection resistor 32 is connected to the negative polarity of DC power supply 1.

Here, the modulated drive signal from PWM modulator 30 and an inverted signal obtained by inverting the modulated drive signal by inverter 31 form a pair of modulated drive signals having a mutually inverted relationship. Moreover, the modulated drive signal and an inverted signal obtained by inverting the modulated drive signal by inverter 11 form a pair of modulated drive signals having a mutually inverted relationship. Additionally, the inverted signal of the modulated drive signal and an inverted signal obtained by inverting the inverted signal of the modulated drive signal by inverter 21 form a pair of modulated drive signals having a mutually inverted relationship.

Connection point P1 between the source of MOS transistor Q1 and the drain of MOS transistor Q2 in half bridge circuit 10 is connected to a first terminal of actuator 2. Connection point P2 between the source of MOS transistor Q3 and the drain of MOS transistor Q4 in half bridge circuit 20 is connected to a second terminal of actuator 2.

In half bridge circuit 10 configured as above, MOS transistors Q1 and Q2 have a mutually inverted relationship, and are switched between on and off according to a modulated drive signal from PWM modulator 30, and the output signal after the switching is output to actuator 2 through connection point P1. In half bridge circuit 20 configured as above, MOS transistors Q3 and Q4 have a mutually inverted relationship, and are switched between on and off according to an inverted signal of the modulated drive signal from PWM modulator 30, and the output signal after the switching is output to actuator 2 through connection point P2.

Signal generating circuit 51 generates a hold signal, which is, for example, a rectangular pulse signal of predetermined period T1, in synchronization with a low-frequency signal having a predetermined period from signal generator 50, and outputs the hold signal to hold circuit 34. Moreover, signal generating circuit 51 generates a drive signal, which is, for example, a rectangular pulse signal of predetermined period T2 (<T1), in synchronization with the low-frequency signal having a predetermined period from signal generator 50, and outputs the drive signal to multiplier 36.

Average value detecting circuit 33 receives an output voltage of current detection resistor 32 as an input, detects a time-averaged value (per predetermined period) of the output voltage, and outputs an average value signal to hold circuit 34.

Hold circuit 34 holds, according to the hold signal input from signal generating circuit 51, the average value signal from average value detecting circuit 33 during the period indicated by the hold signal. Hold circuit 34 then outputs the output signal after the holding to comparator 35.

Comparator 35 compares the output signal input from hold circuit 34 with a target amplitude signal input from an external control circuit, and outputs, to multiplier 36, a comparison result signal indicating a control value which is the result of the comparison.

Multiplier 36 multiplies the comparison result signal input from comparator 35 and the drive signal input from signal generating circuit 51, and outputs, to PWM modulator 30, a multiplication result signal indicating the result of the multiplication.

PWM modulator 30 generates a PWM drive signal, which is a modulated drive signal, by performing PWM modulation on the signal from signal generator 60 which generates a high-frequency signal having a predetermined period, according to the multiplication result signal input from multiplier 36. PWM modulator 30 then outputs the PWM drive signal to half bridge circuits 10 and 20. Here, PWM modulator 30 generates a PWM drive signal by adjusting the ratio of on/off time of the PWM drive signal according to the multiplication result signal, and outputs the PWM drive signal.

[1-2. Operation]

An operation of the actuator driving device configured as above will be described below.

FIG. 2 is a timing chart of a signal waveform of each unit indicating an operation of the actuator driving device illustrated in FIG. 1.

The resistance value of current detection resistor 32 is set to a value significantly less than the on-time resistance value of the series circuit including MOS transistors Q1 and Q2 and the on-time resistance value of the series circuit including MOS transistors Q3 and Q4, for current detection. Accordingly, a DC voltage from DC power supply 1 is applied with almost no change between the drain of MOS transistor Q1 and the source of MOS transistor Q2 in half bridge circuit 10, and between the drain of MOS transistor Q3 and the source of MOS transistor Q4 in half bridge circuit 20. The voltage applied to actuator 2 in such a connection state is the potential difference between the output voltages of two half bridge circuits 10 and 20 (between connection points P1 and P2).

The output voltage of the half bridge circuit, for example, of half bridge circuit 10, is the voltage of power supply 1 when MOS transistor Q1 is on and is zero when MOS transistor Q2 is on. Accordingly, the average value of the output voltage is a value obtained by multiplying the voltage of power supply 1 by the ratio of the on-time period of MOS transistor Q1.

The modulated drive signal from PWM modulator 30 is input with no change to half bridge circuit 10, which is one of two half bridge circuits 10 and 20. An inverted signal of the modulated drive signal is input to half bridge circuit 20, which is the other one of half bridge circuits 10 and 20, via inverter 31. Since when the on/off ratio of the modulated drive signal (output voltage) of PWM modulator 30 is 50:50, the ratio of the on-time period of MOS transistors (Q1 and Q3) in half bridge circuits 10 and 20 are equal to each other, the average values of the output voltages of two half bridge circuits 10 and 20 are equal to each other, making the voltage applied to actuator 2 zero.

When the on/off ratio of the modulated drive signal (output voltage) of PWM modulator 30 is 40:60, the on/off ratio of the input signal to half bridge circuit 10 is 40:60, and the on/off ratio of the input signal to half bridge circuit 20 is 60:40. In other words, the ratio of the on-time period of upper MOS transistor Q1 on the higher on-ratio side and the ratio of the on-time period of MOS transistor Q3 on the lower on-ratio side are different by 60−40=20%. During the period, from DC power supply 1 to actuator 2, a positive DC voltage is applied on the higher on-ratio side and a negative DC voltage is applied on the lower on-ratio side. Accordingly, this is equivalent to that a voltage with an amplitude of 20% of the power supply is applied to actuator 2.

In this regard, circuit operations, particularly, operations of MOS transistors Q1, Q2, Q3, and Q4 will be described. Here, an on-modulated drive signal is referred to as an on-signal, and an off-modulated drive signal is referred to as an off-signal. First, operations of MOS transistors Q1, Q2, Q3, and Q4 when an on-signal is input will be described. An on-signal is input to MOS transistor Q1, so that MOS transistor Q1 is turned on. Since an inverted signal of the on-signal is input to MOS transistor Q2 by inverter 11, MOS transistor Q2 is turned off. Since an inverted signal of the on-signal is input to MOS transistor Q3 by inverter 31, MOS transistor Q3 is turned off. Since an inverted signal of the inverted signal of the on-signal, that is, an on-signal, is input to MOS transistor Q4 by inverter 21, MOS transistor Q4 is turned on. In this case, a current flows through actuator 2 in the order of DC power supply 1, MOS transistor Q1, connection point P1, actuator 2, connection point P2, and MOS transistor Q4. In other words, when an on-signal is input, a DC power supply is applied so that the first terminal of actuator 2 has a positive polarity and the second terminal of actuator 2 has a negative polarity.

Next, operations of MOS transistors Q1, Q2, Q3, and Q4 when an off-signal is input will be described. An off-signal is input to MOS transistor Q1, so that MOS transistor Q1 is turned off. Since an inverted signal of the off-signal is input to MOS transistor Q2 by inverter 11, MOS transistor Q2 is turned on. Since an inverted signal of the off-signal is input to MOS transistor Q3 by inverter 31, MOS transistor Q3 is turned on. Since an inverted signal of the inverted signal of the off-signal, that is, an off-signal is input to MOS transistor Q4 by inverter 21, MOS transistor Q4 is turned off. In this case, a current flows through actuator 2 in the order of DC power supply 1, MOS transistor Q3, connection point P2, actuator 2, connection point P1, and MOS transistor Q2. In other words, when an off-signal is input, a DC power supply is applied to actuator 2 so that the second terminal of actuator 2 has a positive polarity and the first terminal of actuator 2 has a negative polarity.

Here, the on/off ratio of the modulated drive signal of PWM modulator 30 is 40:60. Hence, the period during which the second terminal of actuator 2 has a positive polarity and the first terminal of actuator 2 has a negative polarity occurs for 20% which is the difference in ratio of on-time period. This is equivalent to that a voltage with an amplitude of 20% of the power supply is applied to actuator 2 so that the second terminal of actuator 2 has a positive polarity and the first terminal of actuator 2 has a negative polarity.

When the on/off ratio of the output of PWM modulator 30 is 60:40, the polarity of the voltage applied to actuator 2 is opposite and the applied voltage is equivalent. In other words, when the on/off ratio of the modulated drive signal of PWM modulator 30 is 60:40, the period during which the first terminal of actuator 2 has a positive polarity and the second terminal of actuator 2 has a negative polarity occurs for 20% which is the difference in ratio of on-time period. This is equivalent to that a voltage with an amplitude of 20% of the power supply is applied to actuator 2 so that the first terminal of actuator 2 has a positive polarity and the second terminal of actuator 2 has a negative polarity.

Upper and lower MOS transistors (Q1 and Q2) in half bridge circuit 10 and upper and lower MOS transistors (Q3 and Q4) in half bridge circuits 20 are driven such that one of the upper and lower MOS transistors in each circuit is always on except a short period for preventing a flow-through current caused by being simultaneously turned on. Since the output impedance of DC power supply 1 is generally sufficiently low, both terminals of actuator 2 are equivalent to always being in a state that is short circuited with a low resistance value. Accordingly, actuator 2 is always in a state which is electrically braked, leading to suppression of the ringing of the control position of actuator 2.

Signal generating circuit 51 generates and outputs a hold signal and a drive signal in synchronization with a low-frequency signal having a predetermined period from signal generator 50. Here, a drive signal is input to multiplier 36, and is multiplied with a comparison result signal input from comparator 35. The amplitude of a multiplication result signal, which is the result of the multiplication, is adjusted about the output amplitude 50% according to the comparison result signal, as indicated by the output signal of multiplier 36 in FIG. 2. The multiplication result signal is output to PWM modulator 30.

The multiplication result signal input from multiplier 36 is converted by PWM converter 30 into the on/off ratio of the PWM drive signal, and is output with the signal waveform as indicated by the output signal of PWM modulator 30 in FIG. 2. The modulated drive signal, which is an output signal from PWM modulator 30, is input to two half bridge circuits 10 and 20 as described above, so that actuator 2 is driven in negative and positive directions according to the on/off ratio.

Here, the current flowing through current detection resistor 32 is the sum of the current flowing through lower MOS transistors Q2 and Q4 in two half bridge circuits 10 and 20. Regardless of the direction of the current flowing through actuator 2, a voltage is generated with the source sides of lower MOS transistors Q2 and Q4 in two half bridge circuits 10 and 20 as the positive direction. As illustrated in FIG. 2, average value detecting circuit 33 generates an average value signal obtained by time-averaging the generated voltage. As clear from FIG. 2, immediately after the value of the drive signal from signal generating circuit 51 varies, the direction of the voltage applied to actuator 2 varies. Hence, due to the influences of inductance components of actuator 2, a current unstable period occurs. Although FIG. 2 shows the variations in the negative direction, variations in a positive direction also occur.

Hold circuit 34 holds and outputs the average value signal of average value detecting circuit 33 according to the hold signal from signal generating circuit 51. The hold period of the hold signal is indicated by high level in FIG. 2. This period occurs when sufficient time passes after the value of the drive signal from signal generating circuit 51 varies. Accordingly, it is possible to accurately measure the current flowing through actuator 2. Comparator 35 then compares the output signal from hold circuit 34 with an input target amplitude signal to generate a comparison result signal indicating a control value. With such configuration, it is possible to accurately match the drive current of actuator 2 with the target amplitude.

[1-3. Advantageous Effects, Etc.]

As described above, in the present embodiment, it is possible to accurately match the drive current of actuator 2 with the target amplitude. Accordingly, when actuator 2 is used which accurately determines the amount of displacement by a drive current, it is possible to accurately match the amount of displacement of actuator 2 with the target amplitude. Moreover, actuator 2 is driven equivalently to the state where the both terminals of actuator 2 are always short circuited with a low resistance value, thereby making actuator 2 always being electrically braked. This suppresses ringing which occurs when the position of actuator 2 varies, reaching the correct position within a short period.

(Variation)

In the first embodiment above, MOS transistors Q1 to Q4 are used for forming half bridge circuits 10 and 20. The present disclosure is not limited to this example. Switching elements each having both terminals turned on and off according to a drive signal input to a control terminal may be used.

Other Embodiments

As described above, the first embodiment has been described as an example of the technique disclosed in the present application. However, the technique according to the present disclosure is not limited to such an example. The technique is also applicable to embodiments arrived at by making various modifications, interchanges, additions or omissions. Additionally, a new embodiment may be made by combining various structural elements described in the first embodiment.

Hereinafter, an example of another embodiment will described below.

In the first embodiment, the current detection output voltage of a rectangular pulse shape of current detection resistor 32 is averaged by average value detecting circuit 33, and detected as a flat current level. The present disclosure is not limited to such an example. In the case where the inductance of actuator 2 is sufficiently large, the current flowing through current detection resistor 32 is averaged, and the current waveform is flat, average value detecting circuit 33 may be omitted. In this case, in a similar manner to the case where average value detecting circuit 33 is disposed, it is possible to accurately measure the current flowing through actuator 2.

As described above, embodiments have been described as examples of the technique according to the present disclosure. To this extent, the accompanying drawings and detailed description are provided.

Thus, the structural elements set forth in the accompanying drawings and detailed description include not only structural elements essential to solve the problems but also structural elements unnecessary to solve the problems, for the purpose of illustrating the techniques. Thus, those unnecessary structural elements should not be deemed essential due to the mere fact that they are described in the accompanying drawings and the detailed description.

The above embodiments are for providing examples of the technique of the present disclosure, and thus various modifications, interchanges, additions and omissions are possible in the scope of the claims and equivalent scope thereof.

The present disclosure is applicable to a device which drives an actuator capable of obtaining the amount of displacement proportional to an applied drive current. Specifically, the present disclosure is applicable to, for example, an actuator driving device which drives an optical component which displaces the video of a projector.

What is claimed is:

1. An actuator driving device including a first half bridge circuit and a second half bridge circuit which are driven according to a pair of modulated drive signals having a mutually inverted relationship, the first half bridge circuit and the second half bridge circuit generating a drive voltage for an actuator by switching a direct-current (DC) voltage from a power supply to output the drive voltage to the actuator, the first half bridge circuit including a first switching element and a second switching element connected to each other in series, the first switching element and the second switching element being turned on and off according to the pair of modulated drive signals, the second half bridge circuit including a third switching element and a fourth switching element connected to each other in series, the third switching element and the fourth switching element being turned on and off according to inverted signals of the pair of modulated drive signals, a first end of a series circuit including the first switching element and the second switching element and a first end of a series circuit including the third switching element and the fourth switching element are both connected to a positive polarity of the power supply, a second end of the series circuit including the first switching element and the second switching element and a second end of the series circuit including the third switching element and the fourth switching element are connected to each other, the actuator driving device comprising:

a current detection resistor connected between a connection point and a negative polarity of the power supply, the current detection resistor generating and outputting a current detection signal corresponding to a detected current, the connection point being a point where the second end of the series circuit including the first switching element and the second switching element is connected to the second end of the series circuit including the third switching element and the fourth switching element, a hold circuit which holds the current detection signal output from the current detection resistor during a predetermined hold period according to a predetermined hold signal, and generates and outputs an output signal after the holding, a comparator which compares the output signal after the holding with a predetermined target amplitude signal, and generates and outputs a comparison result signal indicating a result of the comparison, a multiplier which multiplies the comparison result signal with a predetermined drive signal, and generates and outputs a multiplication result signal indicating a result of the multiplication, and a pulse-width modulation (PWM) modulator which performs PWM on a high-frequency signal having a predetermined period according to the multiplication result signal to generate a modulated drive signal, and output the modulated drive signal to the first half bridge circuit and the second half bridge circuit.

2. The actuator driving device according to claim 1, further comprising an average value detecting circuit disposed between one end of the current detection resistor closer to the connection point and the hold circuit, the average value detecting circuit time-averaging the current detection signal per a predetermined period to generate a time-averaged value signal and output the time-averaged value signal to the hold circuit.

3. The actuator driving device according to claim 1, wherein each of the first to fourth switching elements is a metal-oxide-silicon (MOS) transistor.

4. The actuator driving device according to claim 1, wherein each of the first half bridge circuit and the second half bridge circuit outputs a drive current for driving the actuator based on the modulated drive signal to control a displacement amount of the actuator.

\* \* \* \* \*